(12) United States Patent
Bernhard et al.

(10) Patent No.: US 7,075,911 B2
(45) Date of Patent: Jul. 11, 2006

(54) METHOD AND SYSTEM FOR ENHANCED PACKET TRANSMISSION IN CELLULAR NETWORKS

(75) Inventors: Urs Peter Bernhard, Nuremberg (DE); Stefan Gruhl, Nuremberg (DE); Jens Mueckenheim, Nuremberg (DE)

(73) Assignee: Lucent Technologies Inc., Murray Hill, NJ (US)

( * ) Notice: Subject to any disclaimer, the term of this patent is extended or adjusted under 35 U.S.C. 154(b) by 817 days.

(21) Appl. No.: 09/996,979

(22) Filed: Nov. 20, 2001

(65) Prior Publication Data
US 2003/0095552 A1    May 22, 2003

(30) Foreign Application Priority Data

| Nov. 22, 2000 | (EP) | ................................... 00310343 |
| Nov. 22, 2000 | (EP) | ................................... 00310344 |
| Oct. 31, 2001 | (EP) | ................................... 01309269 |

(51) Int. Cl.
*H04Q 7/00*    (2006.01)
(52) U.S. Cl. .................................. 370/331; 370/395.21
(58) Field of Classification Search ................ 370/232, 370/235, 236, 329, 331, 332, 350, 395.1, 370/395.21, 395.4, 469
See application file for complete search history.

(56) References Cited

U.S. PATENT DOCUMENTS

| 5,896,373 A * | 4/1999 | Mitts et al. .................. 370/331 |
| 5,940,371 A * | 8/1999 | Mitts et al. .................. 370/236 |
| 6,389,034 B1 * | 5/2002 | Guo et al. .................... 370/441 |
| 6,570,856 B1 * | 5/2003 | Freeburg et al. .......... 370/310.1 |
| 6,611,547 B1 * | 8/2003 | Rauhala ...................... 370/331 |
| 6,683,866 B1 * | 1/2004 | Stanwood et al. .......... 370/350 |

FOREIGN PATENT DOCUMENTS

| WO | WO 99 48255 A | 9/1999 |
| WO | WO 00/33589 | 6/2000 |
| WO | WO 00 44191 A | 7/2000 |

OTHER PUBLICATIONS

European Search Report.

* cited by examiner

*Primary Examiner*—Man U. Phan
*Assistant Examiner*—Toan Nguyen (57) ABSTRACT

QoS scheduling is used for handling multiple data flows in packet switched cellular systems, especially in a packet switched mobile telecommunication system, wherein the scheduling mechanism of a specific cell is coupled with the scheduling mechanism of at least one second cell, in particular by transferring data between the specific cell and at least one second cell comprising a status information concerning data flow within the specific cell.

5 Claims, 5 Drawing Sheets

METHOD AND SYSTEM FOR ENHANCED PACKET TRANSMISSION IN CELLULAR NETWORKS

CROSS-REFERENCE TO RELATED APPLICATIONS

This application is related to copending commonly assigned U.S. patent application Ser. No. 10/002,570, which was filed on Nov. 1, 2001, and entitled "Method And System For UMTS Packet Transmission Scheduling On Shared Downlink Channels".

BACKGROUND OF THE INVENTION

1. Field of the Invention

The invention relates to communications; in particularly, packet transmission scheduling for cellular networks and to a packet transmission scheduling system having such efficient packet transmission scheduling functionality.

2. Description of the Prior Art

There are problems associated with mobility handling in packet switched networks having scheduling systems, especially in packet switched cellular mobile communication systems, and particularly Code Division Multiple Access systems (CDMA) like Universal Mobile Telecommunication Systems (UMTS) or Time Division Multiple Access systems (TDMA) like General Packet Radio Systems (GPRS).

As known, in packet switching networks the task of multiplexing essentially reduces to the task of ordering packets and to then send them serially over a shared link. This process of serialization is referred to as scheduling. For certain network links, especially for wireless links a certain amount of pre-given link characteristics have to be applied to protocol data units (PDU) to be transmitted, that is traditionally addressed by a segmentation of layer-3-PDU performed by a layer-3 scheduler, whereas a lower so called MAC-scheduler (medium access control-scheduler) provides the medium access control including the provision of respective transport blocks for a transmission data flow via the Physical-layer (PHY-layer).

However, recent scheduling methods consist of independent scheduling systems of each cell within a radio network controller (RNC), such as of an UMTS based network for example, and accordingly, there is in general no interconnection between these schedulers. In case of a handover procedure for example, i.e. when a mobile station is moving out of the coverage of a current cell and hence, has to be handed over towards a new cell which is better able to serve the data flow of the mobile station, within such a recent data transmission scheduling scheme the handover procedure may be described as follows:

Since there is no interconnection between the scheduling systems of different cells, the handover procedure has to be performed by means of a central instance. In packet switched networks this is usually the Service Gateway Sub Node (SGSN).

During the handover procedure the SGSN sends the layer-3 PDUs towards the scheduler of the new or target cell starting with the last layer-3 PDU, which was not completely transmitted by the old cell scheduler.

Then, the target cell scheduler starts to transmit beginning with the first transport block that is segmented from the layer-3 PDU.

By receiving of the transport blocks from this PDU the mobile station has to discard the transport blocks from the PDU that was not entirely transmitted by the scheduler of the old cell.

Since the handover process is performed over a central instance, there is a significant delay for establishing the data transmission in the new cell resulting in an non-continuous data flow with regard to the mobile station and hence for its user. Moreover since the new cell scheduler is starting its transmission always with the first transport blocks from the current layer-3 PDU there is a waste of resources, too.

Since the scheduling status is not transferred to the scheduler serving the new cell, the fact that the flow was potentially backlogged, i.e. it has received less service in the past than it has requested, is not taken into account by the new scheduler.

SUMMARY OF THE INVENTION

The present invention provides an improved approach for packet transmission scheduling, avoiding the above mentioned problems by simultaneously optimizing the transmission of data flows within packet switched cellular systems, in particular adapted to be used for UMTS and/or GPRS systems.

A QoS scheduling is used for handling multiple data flows in packet switched cellular systems, especially in a packet switched mobile telecommunication system, wherein the scheduling mechanism of a specific cell is coupled with the scheduling mechanism of at least one second cell, in particular by transferring data between the specific cell and at least one second cell comprising a status information concerning an actual data flow within the specific cell.

By the coupling of scheduling mechanisms for different cells the use of information from the past of a data flow for an actual scheduling process is provided. Consequently, by an additional use of the inventive status transfer a continuous data flow of higher layer PDUs is achieved. Furthermore, in particular in case of performing a handover of a mobile station, a scheduling means of a target cell is provided, that knows about the current status of served data flows and hence, the transport blocks that were already successfully received by the mobile station must not be newly transmitted resulting in a further optimization of usable radio resources.

By coupling the scheduling mechanism of the target cell, the information about the current status of the served data flow can be used for optimizing the data transmission of that flow within the target cell that may additionally result in an inter-cell compensation of a data flow rate assigned to a user.

Accordingly, by the compensation of data flow rates a required quality of services (QoS) of the data flow is guarantied while optimizing the resource usage. Moreover, it is ensured, that all data flows are served having the requested QoS. If there is still capacity free then the scheduling means handles a compensation or maximal data flow rate. On the other hand side, the same principle can also be used for lowering a data flow rate a certain time for mobile users that came from a low loaded cell into a higher loaded cell in order to give more resources to the other users that are suffering from high loading.

According to one embodiment, the invention provides two scheduling mechanisms per cell, which are linked together such, that a scheduling means of an upper layer provides a certain degree of predictable behavior and a scheduling means of a lower layer provides Medium Access Control (MAC access) and also allows for bandwidth conserving segmentation and allocation strategies.

Advantageously, dependent on the specific network or system these scheduling means may be all part of terrestrial portions of the radio network and may be located within one network element or in separate elements. Therefore, the scheduling approach is adapted to allow a status transfer within scheduling means of one network element and/or a transfer of the status information between different elements, for example, even an inter-RNC handover is supported which is seen as critically in a UMTS system.

This technique may be used in networks having a single upper layer scheduling means per cell cluster and/or a separate upper layer scheduling means per cell.

In particular in UMTS-based networks, with one network controller handling the data flow of a large number of cells it is proposed to provide a single upper layered scheduling means per cell cluster. If however the lower layered scheduling means is located in different network elements causing a difficult handling of the data flows within one single upper layered scheduling means, it is suggested to provide a separate upper layered scheduling means per cell. Moreover, a further advantage thereof is, that a handling of timestamp drifting between the cells might show improved performance, since all search and sort operations are done on a smaller set of items.

In yet another embodiment, a combination of a coupled Layer 3 and MAC (Medium Access Control) layer is used. For the basics of such a combination reference is made to the co-pending European Patent Application 00 310 344.7, "Method of linking two schedulers of a multi-layer network and a network comprising a transceiver having linking functionality for two schedulers" and to the co-pending European Patent Application 00 310 343.9, "Method and System for UMTS Packet Transmission Scheduling on shared Downlink Channels".

Thus, a further enhanced scheduling method is provided which is especially adapted to CDMA-based or TDMA-based mobile communication systems, using a significantly improved adaptation of the basic scheduling method. The contents of European Patent Applications 00 310 343.9 and 00 310 344.7 are incorporated in the disclosure of the present application as Appendix A and B, respectively.

BRIEF DESCRIPTION OF THE DRAWINGS

The invention is described in more detail below and reference is made to the accompanying drawings, in which.

DETAILED DESCRIPTION OF THE INVENTION

Figure 1:
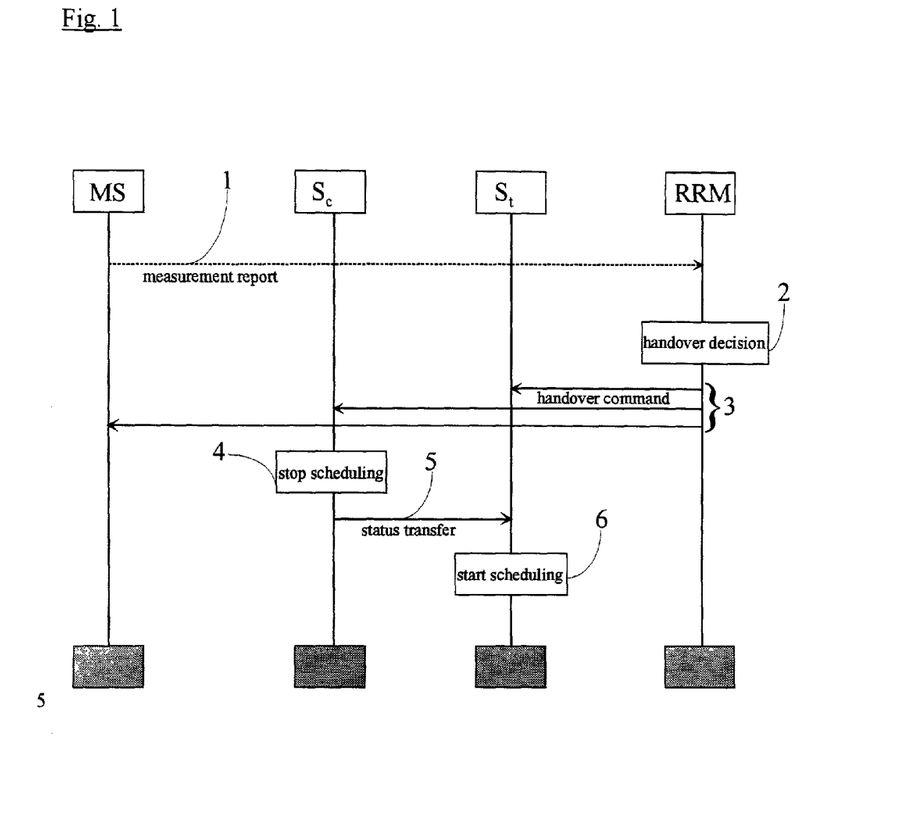
FIG. 1 shows an exemplary signaling flow for a status information update of a UMTS-based network.

Referring next to FIG. 1 a main idea of coupling schedulers over cell boundaries for improving the mobility handling is shown. According to the example of FIG. 1, the coupling is achieved by an explicit transfer of status information about the data flow to be handed over from a current scheduler $S_c$ towards the scheduler $S_t$ of a new or target cell.

It has to be noted, that only the control signaling message data flows are depicted. For simplicity reasons, any eventually necessary acknowledgement (ACK) and/or negative acknowledgement (NACK) forming an important part of a signaling message transfer are neglected, since they are generally known by a person skilled in the art. In the following exemplar description, however, it is always assumed that acknowledgements (ACKs) and/or negative acknowledgements (NACKs) are properly handled by the system.

The example of an information update during a handover procedure, as shown in FIG. 1, incorporates one mobile station MS and one radio network subsystem (RNS) of an UMTS-based network. Within the radio network subsystem there is a radio resource management entity RRM, which has the control of the radio resources of a certain number of cells. Usually, the handover decision functionality is incorporated within the radio resource management block RRM.

The first scheduler $S_c$ belongs to the current cell which serves the data flows of the mobile station MS prior to a handover, whereas the second scheduler $S_t$ handles the data flows for the mobile station of a new or target cell. According to the example, the radio resource management RRM, the first and second scheduler $S_c$ or $S_t$ are all part of the terrestrial radio network. They can be located within one network element, e.g. one radio network controller (RNC) or in separate elements, e.g. two or more radio network controllers (RNCs).

The basic signaling message data flow preferably consists of the following steps relating to the reference signs of FIG. 1:

1. The mobile station MS sends certain measurement reports to the network. These reports normally contain information on the current quality of the radio link. Regarding CDMA systems like UMTS a reporting of the $E_c/I_o$ ratio from the pilot channel of the cell can be used, wherein $E_c$ denotes the received signal energy within the actual cell and $I_o$ denotes the interference at the mobile station MS. Regularly reporting as well as reporting on events that are specified by the network are supported. For example, the measurement reports may be signaled to the resource management entity RRM by piggybacking data on currently scheduled data flows (in-band signaling) or via a separate traffic channel (out-of-band signaling).

2. Based on the reported measurement results the radio resource management entity RRM decides on the necessity to handover (HO) from the current cell towards another or target cell. For this handover decision several criteria can be used. For example, in CDMA systems like UMTS a comparison of reported signal quality in terms of the $E_c/I_o$ ratio from the pilot channels of the different cells is widely used.

3. When the radio resource management entity RRM decides that a handover from the current cell towards a target cell has to be performed it creates a handover command message that will be sent to all involved entities, i.e. the mobile station MS, the scheduler $S_c$ of the current cell and the scheduler $S_t$ of the target cell. This message contains the information that a handover is necessary and the data which are necessary for the (re-)configuration of the entities, such as for example concerning the transport format set, the spreading factor etc., for example, as described in Appendix A. However, as mentioned above, in FIG. 1 only an example of the sequence of messages is shown independent of the exact order since other solutions might also be used.

4. When the scheduler $S_c$ of the current cell receives the handover command message it stops the scheduling procedure for the data flows of the mobile MS by removing its context from the scheduler $S_c$.

5. Then, the scheduler $S_c$ of the current cell transfers the status information to the scheduler $S_t$ of the target cell. Practically, the status information is including at least the identifiers of the data flow, the number of the layer-3 PDU and the number of the transport blocks (TBs) that were successfully acknowledged by the mobile station MS. Even if the FIG. 1 shows only the logical data flow, physically the flow may also pass the radio resource management entity RRM.

6. After the scheduler $S_t$ of the target cell has received the status transfer message it starts the scheduling process also for the flows of the mobile station MS that were identified with the flow identifiers by including the context into the scheduler $S_t$. The starting transport block is the subsequent transport block with regard to the transport block last successfully acknowledged by the mobile station MS.

The message signaling flow description aforementioned does not consider the problem of rerouting the layer-3 PDUs from scheduler $S_c$ towards scheduler $S_t$. However, from the scheduling point of view it has to be ensured that at the begin of step 6 the scheduler $S_t$ has access to the layer-3 PDUs to be scheduled next for the mobile station MS. When using the inventive scheduling method with two coupled schedulers as described, for example, in Appendix A, the routing method depends on the kind of implementation of the PDU-scheduler. The inventive scheduling approach supports one single PDU-scheduler handling the data flows from a cluster of a certain number of cells as well as separate PDU-schedulers handling the data flows for one cell, only, as it is described in more detail below.

Figure 2:
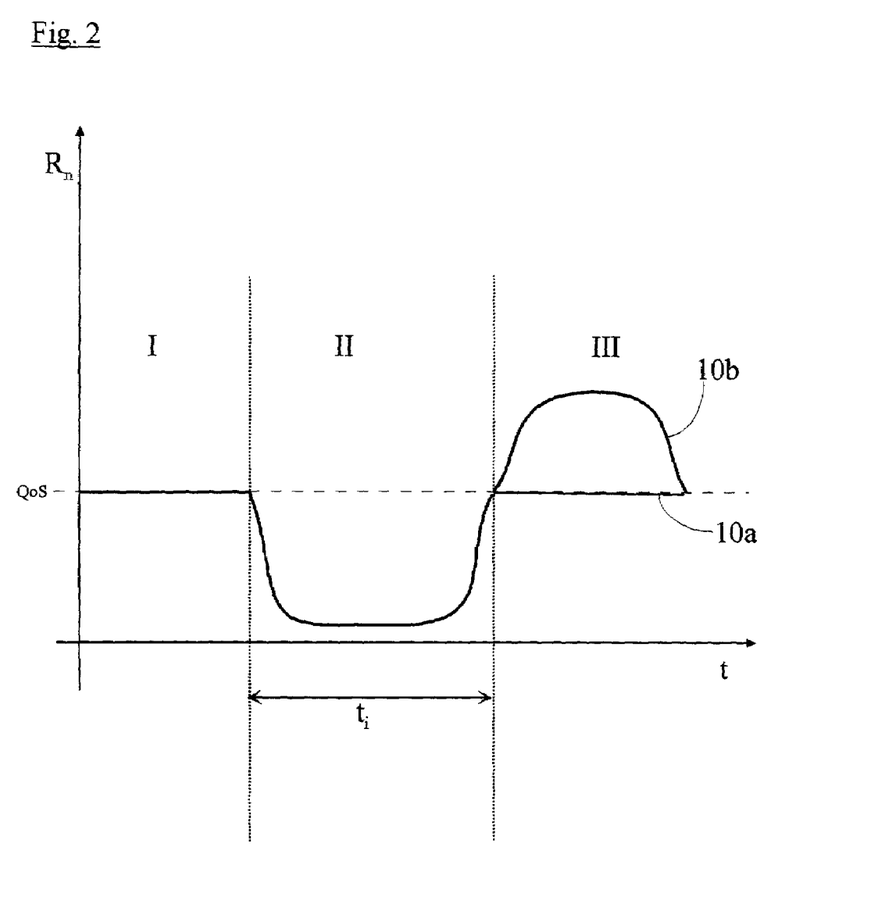
FIG. 2 shows an example concerning the principle of an inter-cell compensation.

By the coupling of schedulers $S_c$ and $S_t$, each of which associated to a different cell according to the invention it becomes possible to make use of the information from the past of a data flow for the actual scheduling process. This can be used in addition for the compensation of data flow rates in order to meet the required quality of services (QoS) of the data flow while optimizing the resource usage. Such methodology may be referred-to as "inter-cell compensation". The principle of inter-cell compensation is depicted in FIG. 2, showing a data flow rate $R_n$ used for user #n versus the time t. The drafted example is based on the situation, when a mobile user moves from a low loaded cell, represented by the area marked with I, to a higher loaded cell, represented by the area marked with II and then back to a low loaded cell, represented by the area marked with III. It is assumed that the used data flow rate $R_n$ assigned to user #n in area I is equal to the data flow rate $R_{QoS}$ according to the required QoS of the associated service. If the mobile station moves into the higher loaded area II, then according to the rate conserving policy, as described in Appendix A, the scheduler of this area assigns a data rate $R_n$ which may be lower than the originally assigned one, i.e. lower than $R_{QoS}$. When the mobile user moves again to a lower loaded area III a normal scheduling method would assign the data flow rate $R_{Qos}$ which is chosen according to the required QoS of the service. This is represented by the line referenced by 10a. In contrast to this conventional method, by use of the inventive approach, a higher data rate $R_n$ represented by the line referenced by 10b, is assigned to the user in area III for a certain amount of time in order to allow him to "compensate" for the lower data rate he experienced in area II. This helps to still maintain the long term QoS of the associated service even in case the short term QoS is violated for a certain time period $t_i$.

The assignment of the data rates $R_n$ and time duration of the "compensation" phase has to be done according to the decreasing of the flow rate $R_n$ in area II and the time interval $t_i$. However, it has to be noted, that the duration of this time interval $t_i$ is critical to the performance of the inventive method. Depending on the respective specific system and environment parameter, if the time interval $t_i$ is too large, then the inter-cell compensation 10b may have no effect on the service QoS and needs therefore not to be used in this case.

Therefore, for the purpose of inter-cell compensation it is proposed to enhance the assignment of the transport format set (TFS) for the data flows and the scheduling policy with regard to the proposal of minimum and maximum values, as given, for example, in Appendix A.

According to the invention, three main values of a transport format are preferred, that are defined as follows:
  A minimum value, according to which the transport format has to be assigned regarding the minimum requirements to achieve just the requested QoS for each data service, as described for example in Appendix A.
  A compensation value, according to which a transport format may be assigned for the inter-cell compensation of data flows coming e.g. from highly loaded cells.
  A maximum value for a transport format to be used for optimizing the scheduling decision, when there are resources still available, e.g. for pro-active scheduling, as described for example in Appendix A.

As discussed in Appendix A, more transport formats than these principal ones might be assigned for higher granularity of data rates in order to reduce extensive padding. However, the MAC scheduling policy proposed in Appendix A, may be modified for doing inter-cell compensation: Therefore it is suggested, that the MAC scheduler takes the minimum transport formats with highest priorities, i.e. it tries to ensure that all data flows are served having the requested QoS. If there is still capacity free then the scheduler handles the "compensation traffic" and the "maximum traffic", where priority might be given to "compensation traffic".

The same principle can also be used for lowering a data flow rate a certain time for mobile users that came from a low loaded cell into a higher loaded cell in order to give more resources to the other users that are suffering from high loading.

A first very preferred implementation of the inventive scheduling approach comprises the implementation of a single PDU-Scheduler per cell cluster.

Figure 3:
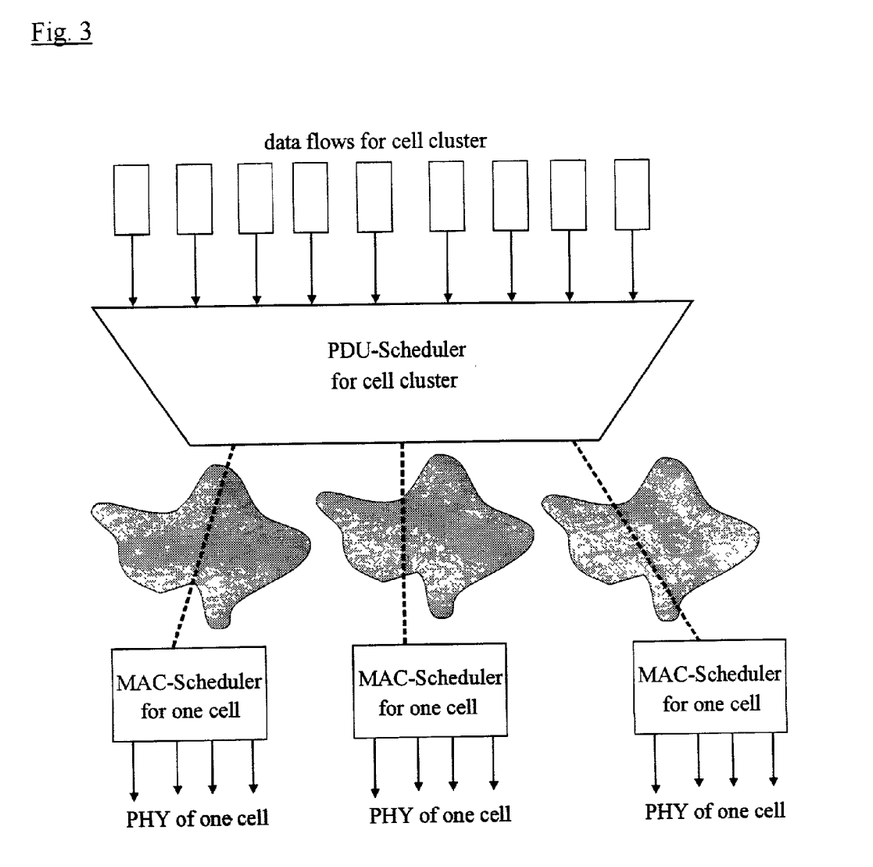
FIG. 3 shows a first preferred approach according to the invention using one PDU-scheduler per cell cluster.

As known for a person skilled in the art, in a UMTS-based network, one radio network controller (RNC) handles the data flows for a large number of cells. Here, it might be reasonable to apply one PDU-scheduler not only for one cell, but also for a cell cluster that incorporates cells from a certain connected area. The principle of such a common scheduler is depicted in FIG. 3, according to which one PDU-scheduler is used for a cell cluster with an exemplar number of three cells.

According to the principles described in Appendix A, the upper PDU-scheduler operates on the input data from layer-3, the Protocol Data Units (PDU). It receives the QoS requirements of each data flow. When the availability of schedulable PDUs are notified to the QoS-scheduler it determines the order in which PDUs should receive service. Each of the MAC-scheduler serves only the PDUs that are related to its cell from this list and tries to reflect the order in the list, while also taking timing and power constraints into account. The MAC-scheduler is active at every frame, e.g. on a 10 ms base, and schedules the data flows related to its cell. The PDU-scheduler is operated on all active data flows of the cell cluster, i.e. with a non-empty PDU-flow-queue.

Since prior systems of serially uncoupled schedulers can show undesirable behavior, both schedulers are linked together by means that the MAC scheduling is driven by the PDU scheduler's state. This is shown as clouds in FIG. 3 for each MAC scheduler. Such linking causes that only one PDU list per cell cluster has to be maintained, that in case of performing a handover to a cell, which is also served by the same cluster, the scheduler $S_t$ of the target cell (FIG. 1) can directly start with its transmission after it has received the status information transfer message from the scheduler of the old or former cell, because it accesses the same PDU list. The "routing" is simply done by the aforementioned status information transfer. Hence, an extra PDU rerouting is not necessary.

It is known, that a working with flow time stamps, as argued for example by J. Cobb, M. Gouda and A-EL-Nahas in "Flow timestamps", Annual Joint Conference of Information Sciences 1995 (Appendix C) eases the estimation of processing time since the upper limit of elements in the service-list of a PDU-scheduler can be limited to the maximum number of flows in the system. However, especially when using relative dynamic priorities for the PDU scheduling, as described for example in this identified document, the method of one single PDU scheduler may show undesirable behavior when doing handover as described in the following:

In some circumstances it happens that the priorities, which have the nature of a virtual timestamp in this example, drift away from each other for PDUs associated with different cells. Usually the timestamps are naturally kept in a close range, because always the leading packets are served, thus the distance of all timestamps is narrowed by the scheduling process. Due to the fact that only a PDU can be served by its recently serving cell this can lead to clustering within the serving list. One reason might be that within the cluster cells with low load and other cells with higher load are combined for PDU scheduling.

In this case the timestamps that are currently handled by a scheduler of a highly loaded cell may become much different from those handled by a scheduler of a low loaded cell. In terms of virtual clock scheduling the perceived service time in the highly loaded cell progresses slower than in the less loaded cell. Thus, the highly loaded cell will result in PDUs with small timestamps and such high priorities, while the others were served in the past have large timestamps and such lower priorities.

Figure 4:
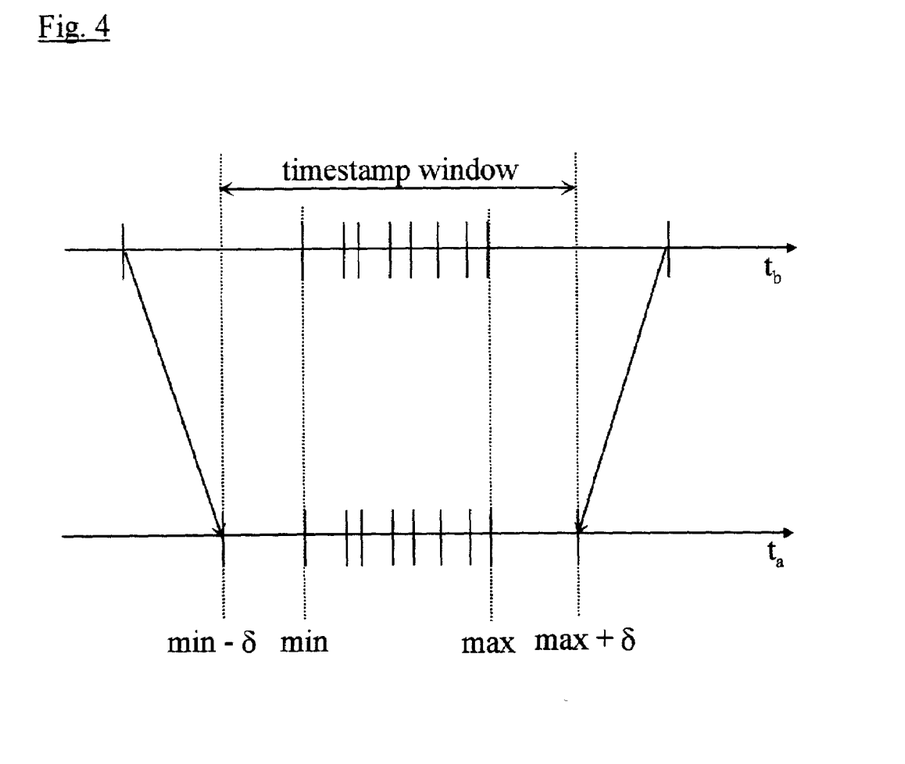
FIG. 4 shows an exemplar synchronization of data flows between cells by timestamp shifting.

Then, in case of handing over a user from e.g. a high loaded cell towards a lower loaded cell the scheduler would only grant service to the handover flow and fully compensate for its lack of service in the past. This may be only partially desirable. Although the radio resource allocation entity (RRA), as described in Appendix A, should try to avoid this by properly assignment of radio resources according to the current cell load and QoS requirements of the data flows, this situation still might occur. In this case a "synchronization" of the data flows between the cells when a handing over is performed is preferably applied. This synchronization procedure is done practically by shifting the time stamps when a handover is performed, as shown in FIG. 4. In FIG. 4, $t_b$ is representing the time with regard to the old cell, i.e. before the handover is performed, and $t_a$ is representing the time with regard to the new or target cell, i.e. after the handover is performed.

Accordingly, for maintaining a limited fair scheduling the difference between the timestamps of the current and target cell are decreased by timestamp shifting, wherein FIG. 4 shows the situation before and after the timestamp shifting. For achieving this defined goal of maintaining a limited fair scheduling, preferably a timestamp window is defined according to the timestamps of the currently served data flows. Regarding FIG. 4, the timestamp window is defined by "min" identifying the minimum timestamp value of all PDUs of the currently scheduled data flows associated with this cell, "max" identifying the maximum timestamp value of all PDUs of the currently scheduled data flows associated with this cell, "δ" identifying a timestamp offset value that is used for inter-cell compensation as described above.

For performing the timestamp shifting the following steps are proposed:

If the timestamp of the data flow in the old cell is below the value determined by "min−δ" of the target cell, the timestamp will be shifted towards that "min−δ" when executing the handover towards the target cell;

If the timestamp of the data flow in the old cell is above the value determined by "max+δ" of the target cell, the timestamp will be shifted towards that "max+δ" when executing the handover towards the target cell;

If the timestamp of the data flow in the old cell is between the values respectively determined by "min−δ" and "max+δ" of the target cell, the timestamp will not be shifted when executing the handover towards the target cell.

By the usage of such an algorithm it is possible to limit the timestamp variations when handing over the mobile station from a current cell to another or new cell. However, by performing the shifting procedure a search operation over the service list in the PDU scheduler might become necessary.

When using the above described single PDU scheduler refinement the traffic to be compensated gets the highest priority and always will be served first from the MAC scheduler in the target cell.

Since, however, in some cases this might violate the desired scheduling policy. Thus, a very preferred refinement of the invention incorporates a separate PDU-Scheduler per cell, the principles thereof are illustrated by FIG. 5.

According to the above discussed it might be desirable to have a separate PDU scheduler per cell, in particular since
- the handling of the timestamp drifting between the cells might show improved performance with separate PDU schedulers, where all search and sort operations are done on a smaller set of items, and
- the handling of the data flows within one single PDU-scheduler is difficult, when the MAC schedulers are located in different network elements, especially caused by neighbor cells that are controlled by different radio network controllers (RNCs) when an inter-RNC handover is required.

Figure 5:
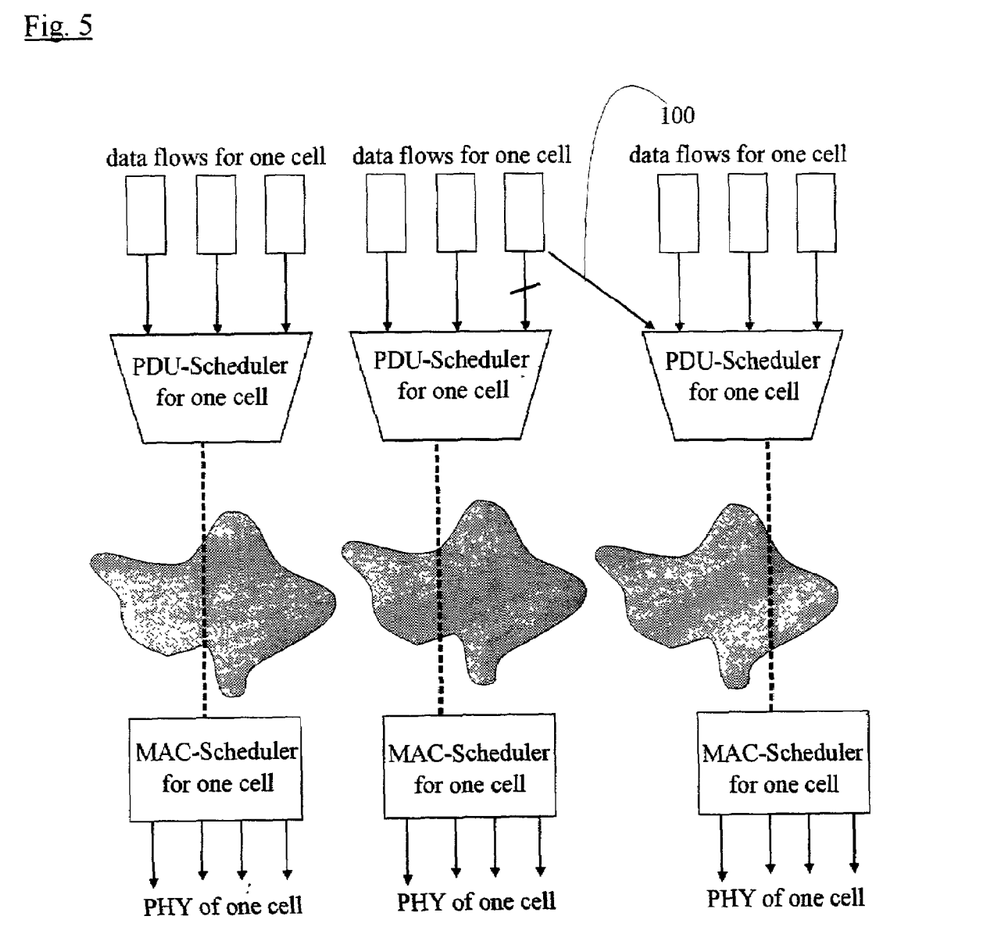
FIG. 5 shows a second preferred approach according to the invention using a separate PDU-scheduler per cell.

Based on FIG. 5, showing the example of a separate PDU-Scheduler per cell of three cells, with an intra-RNC handover from one cell to another cell, as indicated by the arrow 100 and according to the principle described in Appendix A, each of the upper PDU-schedulers operates on the input data from layer-3, the so-called Protocol Data Units (PDU). Each of the PDU-Schedulers receives the QoS requirements of each data flow of the respective cell. When the availability of schedulable PDUs are notified to the QoS-scheduler it determines the order in which PDUs should receive service. The MAC-scheduler serves the PDUs from this list and tries to reflect the order in the list, while also taking timing and power constraints into account.

The MAC-scheduler is active at every frame, e.g. on a 10 ms base. It schedules the data flows related to one cell. The PDU-scheduler is operated on the active flows of the cell, i.e. with a non-empty PDU-flow-queue. As mentioned above, since systems of serially uncoupled schedulers can show undesirable behavior, both schedulers are linked together by means that the MAC scheduling is driven by the PDU scheduler's state. This is shown as clouds in FIG. 5 for each MAC scheduler.

In case of a handover between two schedulers not only the status information has to be transferred from the old scheduling system towards the target scheduler as described with regard to FIG. 1. The layer-3 PDUs may be rerouted to the new PDU scheduler, which happens for inter-RNC handover.

In the case of intra-RNC handover, where the PDU queue is accessible for all MAC schedulers running in this network element, the separate scheduling system may still access the already existing PDU queue without need to move the LLC data, i.e. logical-link-control data. This case is depicted in FIG. 5.

In contrast to the scheduling method having a single PDU scheduler as described with regard to FIG. 3 the scheduling method of separate scheduler per cell allows an easier synchronization of the data flows without rearranging a large PDU list. For the internal scheduling computation each scheduler treats a handover flow similar to a newly established flow in its cell. When using the invention by means of a separate PDU scheduler per cell the priority of the traffic to be compensated and hence the MAC scheduling order in the target cell is implicitly given by the MAC scheduler policy and the assignment of the transport format set as described with regard to FIG. 2.

According to the above description of preferred embodiments, one main application of the invention is the MAC level scheduling system preferably using a combination of coupled Layer 3 and MAC layer schedulers. However, the invention also is covering embodiments adapted to be used in general by scheduling systems, where the task of efficient mobility handling on MAC level has to be solved.

Moreover, as it is obvious for a person skilled in the art, the proposed scheduling approach is especially suited for scheduling data flows of a CDMA-based system or TDMA-based system or for scheduling systems in packet switched cellular mobile communication systems like UMTS or GPRS but not limited to these standards.

We claim:

1. A method of scheduling multiple data flows for quality of service adjustment in a packet switched cellular system, comprising the steps of:
   coupling a first scheduling mechanism of a first cell with a second scheduling mechanism of a second cell; and
   adjusting a data transmission rate for a user equipment in dependence on a data flow rate ensured during a preceding time thereby providing a definable minimum value for the data transmission rate, a medium value for the data transmission rate or a maximum value for the data transmission rate; and
   timestamp shifting during a handover including the step of defining a minimum timestamp value of PDUs of currently scheduled data flows associated with the first cell, defining a maximum timestamp value of all PDUs of currently scheduled data flows associated with the first cell or defining a timestamp offset value adapted to be used for an inter-cell compensation.

2. A method of scheduling multiple data flows for quality of service adjustment in a packet switched cellular system, comprising the steps of:
   coupling a first scheduling mechanism of a first cell with a second scheduling mechanism of a second cell; and
   timestamp shifting during a handover, the timestamp shifting including the step of defining a minimum timestamp value of PDUs of currently scheduled data flows associated with the first cell, or defining a maximum timestamp value of all PDUs of currently scheduled data flows associated with the first cell, or defining a timestamp offset value adapted to be used for an inter-cell compensation.

3. The method of claim 2, wherein the step of coupling comprises the step of transferring data having a status information concerning a data flow to be handed over from the first scheduling mechanism of the first cell towards the second scheduling mechanism of the second cell.

4. The method of claim 2, wherein at least one of the first and second scheduling mechanisms is ensured by linking at least two schedulers each operating on a different protocol layer, wherein each protocol data unit of an incoming data flow to be transmitted is scheduled by a scheduler on an upper layer regarding pre-definable associated quality of service requirements into a priority list to be served by a scheduler of a lower layer.

5. The method of claim 2, further comprising the steps of:
   sending a measurement report comprising information of the current quality of a radio link concerning the first cell, depending on the necessity to handover a user equipment from the first cell to the second cell based on the reported measurement;
   transmitting a handover command message to involved entities;
   terminating a scheduling procedure of the first cell for the data flows of the user equipment;
   transmitting a status information for the data flows of the user equipment to the second cell; and
   starting a scheduling procedure of the second cell for the data flows of the user equipment.

* * * * *